(12) United States Patent
Park et al.

(10) Patent No.: US 10,096,820 B2
(45) Date of Patent: Oct. 9, 2018

(54) NEGATIVE ACTIVE MATERIAL FOR RECHARGEABLE LITHIUM BATTERY, METHOD PREPARING THE SAME AND RECHARGEABLE LITHIUM BATTERY INCLUDING THE SAME

(71) Applicant: Samsung SDI Co., Ltd., Yongin-si, Gyeonggi-do (KR)

(72) Inventors: Sang-Eun Park, Yongin-si (KR); Young-Ugk Kim, Yongin-si (KR); Jae-Myung Kim, Yongin-si (KR); Deok-Hyun Kim, Yongin-si (KR); Yeon-Gap Kim, Yongin-si (KR); Kyu-Nam Joo, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 842 days.

(21) Appl. No.: 13/956,230

(22) Filed: Jul. 31, 2013

(65) Prior Publication Data

US 2014/0038040 A1 Feb. 6, 2014

Related U.S. Application Data

(60) Provisional application No. 61/680,068, filed on Aug. 6, 2012.

(51) Int. Cl.
*H01M 4/134* (2010.01)
*H01M 4/04* (2006.01)
(Continued)

(52) U.S. Cl.
CPC ............ *H01M 4/362* (2013.01); *H01M 4/04* (2013.01); *H01M 4/131* (2013.01); *H01M 4/134* (2013.01); *H01M 4/48* (2013.01); *H01M 4/483* (2013.01); *H01M 10/0525* (2013.01); *H01M 4/364* (2013.01); *H01M 4/625* (2013.01);
(Continued)

(58) Field of Classification Search
CPC ........ H01M 4/04; H01M 4/131; H01M 4/134; H01M 4/362; H01M 4/386; H01M 4/48; H01M 4/483; H01M 10/05–10/0569; H01M 10/24–10/288
See application file for complete search history.

(56) References Cited

U.S. PATENT DOCUMENTS 9,088,045 B2 * 7/2015 Park .................. H01M 4/366
2003/0118905 A1 6/2003 Fukuoka et al.
(Continued)

FOREIGN PATENT DOCUMENTS

CN 1381426 A 11/2002
CN 100405637 C 7/2008
(Continued)

OTHER PUBLICATIONS

Machine translation of Hara et al. JP 2002-042809. Published Feb. 8, 2002.*
(Continued)

*Primary Examiner* — Jonathan Crepeau
*Assistant Examiner* — Jacob Buchanan
(74) *Attorney, Agent, or Firm* — Knobbe Martens Olson & Bear LLP (57) ABSTRACT

In an aspect, a negative active material for a rechargeable lithium battery including surface modified silicon oxide particles is disclosed.

13 Claims, 8 Drawing Sheets

(51) Int. Cl.
*H01M 4/48* (2010.01)
*H01M 10/0525* (2010.01)
*H01M 4/36* (2006.01)
*H01M 4/131* (2010.01)
H01M 4/62 (2006.01)
H01M 4/02 (2006.01)

(52) U.S. Cl.
CPC ............... *H01M 2004/021* (2013.01); *H01M 2004/027* (2013.01); *Y10T 29/49108* (2015.01)

(56) References Cited

U.S. PATENT DOCUMENTS

| | | | |
|---|---|---|---|
| 2006/0099507 A1 | 5/2006 | Kogetsu et al. | |
| 2009/0311606 A1 | 12/2009 | Fukuoka et al. | |
| 2010/0119948 A1 | 5/2010 | Hasegawa et al. | |
| 2010/0288970 A1* | 11/2010 | Watanabe | H01M 4/0428 252/182.1 |
| 2012/0077087 A1 | 3/2012 | Cho et al. | |
| 2012/0202112 A1* | 8/2012 | Yushin | H01M 4/38 429/200 |

FOREIGN PATENT DOCUMENTS

| | | |
|---|---|---|
| CN | 100490223 C | 5/2009 |
| CN | 101609879 A | 12/2009 |
| CN | 101847710 A | 9/2010 |
| CN | 102024992 A | 4/2011 |
| CN | 102208634 A | 10/2011 |
| CN | 102664262 A | 9/2012 |
| EP | 1 986 253 A1 | 10/2008 |
| JP | 2002-42809 A | 2/2002 |
| JP | 2005-294079 A | 10/2005 |
| JP | 2008-251369 A | 10/2008 |
| JP | 2010-225494 A | 10/2010 |
| JP | 2010-272411 A | 12/2010 |
| JP | 2011-051844 A | 3/2011 |
| JP | 2011-065934 A | 3/2011 |
| JP | 2011-090869 A | 5/2011 |
| JP | 2012-099341 A | 5/2012 |
| KR | 10-2010-0113433 A | 10/2010 |

OTHER PUBLICATIONS

Yao, Yan et al., "Interconnected Silicon Hollow Nanospheres for Lithium-Ion Battery Anodes with Long Cycle Life," 2011 Am. Chem. Soc., *Nano Lett.* 2011, 11, 2949-2954.
Extended European Search Report dated Jan. 9, 2014 for European Patent Application No. EP 13 179 198.0 which claims priority from U.S. Appl. No. 61/680,068, filed Aug. 6, 2012, and captioned U.S. Appl. No. 13/956,230.
First Chinese Office Action dated Aug. 15, 2016 for Chinese Patent Application No. CN 201310338196.0, and which claims priority from both U.S. Appl. No. 61/680,068, filed Aug. 6, 2012, and subject U.S. Appl. No. 13/956,230.
Chinese Second Office Action dated Apr. 6, 2017 for Chinese Patent Application No. CN201310338196.0 which claims priority from U.S. Appl. No. 61/680,068, filed Aug. 6, 2012 and subject U.S. Appl. No. 13/956,230.
Korean Office Action dated Apr. 19, 2017 for Korean Patent Application No. KR 10-2013-0092557, which claims priority from U.S. Appl. No. 61/680,068, filed Aug. 6, 2012 and subject U.S. Appl. No. 13/956,230.
Fourth Chinese Office Action dated Jul. 31, 2018 for Chinese Patent Application No. CN201310338196.0 which claims priority from U.S. Appl. No. 61/680,068, filed Aug. 6, 2012 and from subject U.S. Appl. No. 13/956,230. No new references are cited in the Office Action.

* cited by examiner

NEGATIVE ACTIVE MATERIAL FOR RECHARGEABLE LITHIUM BATTERY, METHOD PREPARING THE SAME AND RECHARGEABLE LITHIUM BATTERY INCLUDING THE SAME

CROSS-REFERENCE TO RELATED APPLICATIONS

This application claims priority to and the benefit of U.S. Provisional Application No. 61/680,068 filed Aug. 6, 2012, the disclosure of which is incorporated in its entirety herein by reference.

BACKGROUND

Field

This disclosure relates to a negative active material for a rechargeable lithium battery, a method of preparing the same, and a rechargeable lithium battery including the same.

Description of the Related Technology

Rechargeable lithium batteries have recently drawn attention as a power source for small portable electronic devices. Rechargeable lithium batteries use an organic electrolyte solution and thereby, have twice or more high discharge voltage than conventional batteries using an alkali aqueous solution and may have high energy density.

As for positive active materials for a rechargeable lithium battery, lithium-transition element composite oxides being capable of intercalating lithium such as $LiCoO_2$, $LiMn_2O_4$, $LiNi_{1-x}Co_xO_2$ (0<x<1), and the like, have been investigated.

As for negative active materials of a rechargeable lithium battery, various carbon-based materials such as artificial graphite, natural graphite, and hard carbon, which can intercalate and deintercalate lithium ions, have been used. Alternatively, a non-carbon-based negative active material such as Si have been recently investigated for situations with a need for stability and high-capacity.

SUMMARY

Some embodiments provide a negative active material for a rechargeable lithium battery having low sheet resistance and thus, improving cycle-life as well as electrochemical properties of a rechargeable lithium battery.

Some embodiments provide a method of preparing the negative active material.

Some embodiments provide a rechargeable lithium battery including the negative active material.

Some embodiments provide a negative active material for a rechargeable lithium battery including surface modified silicon oxide particles having a bulk formula represented by $SiO_x$ (0<x<2), said particles comprising a surface, wherein a silicon-to-oxygen ratio (Si/O ratio) at the surface ranges from about 1.0 to about 2.4, wherein oxygen has a concentration profile comprising a substantial increase within a depth from the surface to a certain degree of a particle radius, whereas silicon has a concentration profile comprising a substantial decrease within the depth from the surface to the certain degree the particle radius.

In some embodiments, the silicon oxide particles may have a ratio of silicon relative to oxygen (Si/O ratio) ranging from about 2.0 to about 2.3 on the surface.

In some embodiments, the silicon oxide particles represented by $SiO_x$ may have an x value ranging from about 0.5 to about 1.5, which is a ratio of an oxygen (O) element relative to a silicon (Si) element. In some embodiments, the Si/O ratio ranges from about 1.3 to about 2.0.

In some embodiments, the silicon content of the surface may be measured using X-ray photoelectron spectroscopy (XPS) with ion beam sputtering. In some embodiments, the oxygen content of the surface is measured using X-ray photoelectron spectroscopy (XPS) with ion beam sputtering.

In some embodiments, the bulk formula is represented by $SiO_x$ (0.5≤x≤1.5). In some embodiments, the bulk formula may be represented by $SiO_x$ (0.6≤x≤0.95).

In some embodiments, the silicon oxide particles may have a concentration gradient that the silicon (Si) element has an atom % concentration decreasing from the surface of the particles toward the core thereof while the oxygen (O) element has an atom % concentration increasing from the surface toward the core.

In some embodiments, the negative active material may further include one selected from group consisting of an alkali metal, an alkaline-earth metal, an element belonging to Groups 13 to 16, a transition element, a rare earth element, and a combination thereof.

In some embodiments, the negative active material may have an average particle diameter ranging from about 0.1 μm to about 100 μm.

In some embodiments, the negative active material has a specific surface area ranging from about 5 $m^2/g$ to about 500 $m^2/g$. In some embodiments, the negative active material may have a specific surface area ranging from about 10 to about 500 $m^2/g$.

In some embodiments, the negative active material may further include an oxidation barrier layer on the surface of the silicon oxide particles.

In some embodiments, the oxidation barrier layer may include a carbon-based material.

In some embodiments, the surface modified silicon oxide particles further include a coating or deposits of a carbonaceous material on the surface thereof. In some embodiments, the negative active material further includes a carbonaceous material mixed with the surface modified silicon oxide particles.

Some embodiments provide a method of preparing a negative active material for a rechargeable lithium battery, which includes a reaction of amorphous silicon oxide powder with an etchant.

In some embodiments, the amorphous silicon oxide powder and the etchant may be used in a mole ratio ranging from about 10:1 to about 1:10.

In some embodiments, the etchant may be a compound including an F (fluorine) ion. In some embodiments, the etchant may be aqueous hydrogen fluoride (HF), $NH_4F$, or $NH_4HF_2$. In some embodiments, the etchant may include aqueous hydrogen fluoride (HF), $NH_4F$, or $NH_4HF_2$.

In some embodiments, the preparing method may further include formation of an oxidation barrier layer on a silicon oxide obtained from the reaction of the amorphous silicon oxide powder with the etchant.

Some embodiments provide a rechargeable lithium battery including a negative electrode including a negative active material; and an electrolyte. In some embodiments, the negative electrode may include a current collector including two major surfaces; and a negative active material of as disclosed and described herein formed on at least one of the two major surfaces. In some embodiments, the current collector includes at least one selected from the group consisting of a copper foil, a nickel foil, a stainless steel foil, a titanium foil, a nickel foam, a copper foam, and a polymer substrate coated with a conductive metal.

In some embodiments, the battery has a cycle efficiency from about 60% to about 70%. In some embodiments, the negative active material has a low sheet resistance and may improve cycle-life and electrochemical properties of the rechargeable lithium battery.

Some embodiments provide a method of making a rechargeable lithium battery, the method comprising providing a negative electrode. In some embodiments, the method further includes providing a negative active material as disclosed and described herein. In some embodiments, providing the negative active material includes providing silicon oxide particles, and contacting the particles with an etchant, which modifies particle surfaces, in which a substantial amount of oxygen is removed from the surfaces of the silicon oxide particles. In some embodiments, the silicon oxide particles include amorphous silicon oxide. In some embodiments, the silicon oxide particles and etchant have a mole ratio ranging from about 10:1 to about 1:10. In some embodiments, the etchant includes aqueous hydrogen fluoride (HF), $NH_4F$, or $NH_4HF_2$.

DETAILED DESCRIPTION

Exemplary embodiments of the present disclosure will hereinafter be described in detail. However, these embodiments are only exemplary, and this disclosure is not limited thereto.

Silicon oxide ($SiO_x$) particles typically used as a negative active material may be prepared by mixing silicon (Si) and silicon dioxide ($SiO_2$). However, the silicon oxide particles prepared in this manner has a natural layer having a high oxygen ratio on the surface of the particles. Thus, a ratio of silicon relative to oxygen (Si/O ratio) is typically less than 0.7 on the particle surface even if equal amount of silicon and silicon dioxide are mixed. A high oxygen ratio on the surface of the silicon oxide particles may provide resistance during an insertion reaction with lithium and thus, potentially deteriorate electrochemical properties of a rechargeable lithium battery.

Accordingly, a low oxygen ratio on the surface of the silicon oxide particles may be advantageous for certain applications. In some embodiments, a negative active material including a crystalline silicon oxide having a silicon oxidation number decreased down to less than or equal to about 0.55 and thus, a lower oxygen ratio on the surface through selective etching is provided. In some embodiments, the lower oxygen ratio on the surface may decrease surface resistance and resultantly, improve electrochemical properties and particularly, cycle-life characteristics of a rechargeable lithium battery.

Some embodiments provide a negative active material for a rechargeable lithium battery including surface modified silicon oxide particles having a bulk formula represented by $SiO_x$ (0<x<2). In some embodiments, a silicon-to-oxygen ratio (Si/O ratio) at the particle surface ranges from about 1.0 to about 2.4, in which oxygen has a concentration profile of a steep or substantial increase within a depth from the surface to 20% of a particle radius, whereas silicon has a concentration profile of a steep or substantial decrease within the depth from the surface to 20% of the particle radius.

As used herein, the term "a surface-modified silicon oxide particle" refers to a silicon oxide particle, the surface of which is modified. In embodiments, the surface of the silicon oxide particle is modified by selectively etching a substantial number of silicon dioxide molecules from the surface. For example, the surface-modified silicon oxide particles have, on their surfaces, a number of pores or recesses of a general size of silicon dioxide molecules as a result of the selective etching. Further, for example, the surface-modified silicon oxide particles include an uneven surface configuration when viewing with a scanning electron microscope (SEM).

As used herein, the term "bulk formula" refers to a chemical formula based on the average elemental content of a quantity of material in the "overall mass of the particle" rather than in a local mass or portion of the particle. In the bulk formula, the amount of one element is set as the primary integer and the other element(s) amount(s) is/are normalized to that primary integer. For example, Si (silicon) could provide 25% of a bulk material and O (oxygen) could provide 75% of the bulk material corresponding to a generic bulk formula of $SiO_x$ (the amount of silicon set as the primary integer of 1, and x is 3 normalized to the primary interger provides a bulk formula of $SiO_3$) or a generic bulk formula of $Si_yO$ (the amount of oxygen set as the primary integer of 1, and y is 0.33 normalized to the primary integer provides a bulk formula of $Si_{0.33}O$). In some embodiments, the material may be surface modified silicon oxide particles where the bulk formula is $SiO_x$ (0.5≤x≤1.5).

In some embodiments, the silicon oxide particles may include silicon and oxygen elements in a ratio of 1:1. When the silicon dioxide ($SiO_2$) is selectively etched from the surface of silicon oxide particles, the silicon (Si) content becomes much higher than the oxygen (O) content on the surface of the particles.

Some embodiments provide a negative active material for a rechargeable lithium battery including surface modified silicon oxide particles represented by a bulk formula of $SiO_x$ (0<x<2). At the surface of the particles, a silicon-to-oxygen ratio (Si/O ratio) ranges from about 1.0 to about 2.4. In embodiments, the Si/O ratio is from about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6 and about 2.7. Further, in embodiments, the Si/O ratio is in a range between any two numbers listed in the immediately previous sentence, e.g., between about 1.3 and about 2.2, between about 1.8 and about 2.1, etc. Herein, a ratio of silicon and oxygen on the surface of the silicon oxide may be quantitively analyzed through XPS. In some embodiments, the depth of the surface may be from about 5 nm to about 20 nm. In some embodiments, the depth of the surface may be from about 5 nm to about 15 nm. In some embodiments, the depth of the surface may be from about 1 nm to about 50 nm. In some embodiments, the depth of the surface may be from about 2 nm to about 40 nm. In some embodiments, the depth of the surface may be from about 5 nm to about 30 nm. In some embodiments, the depth of the surface may be from about 1 nm to about 60 nm. In some embodiments, the depth of the surface may be from about 2 nm to about 50 nm. In some embodiments, the depth of the surface may be from about 5 nm to about 50 nm. In some embodiments, the depth of the surface may be from about 10 nm to about 50 nm. In some embodiments, the depth of the surface may be from about 25 nm to about 50 nm.

In some embodiments, the silicon-to-oxygen ratio (Si/O ratio) at the surface ranges from about 1.0 to about 2.4. In some embodiments, the silicon-to-oxygen ratio (Si/O ratio) at the surface ranges from about 1.2 to about 2.4. In some embodiments, the silicon-to-oxygen ratio (Si/O ratio) at the surface ranges from about 1.4 to about 2.4. In some embodiments, the silicon-to-oxygen ratio (Si/O ratio) at the surface ranges from about 1.6 to about 2.4. In some embodiments, the silicon-to-oxygen ratio (Si/O ratio) at the surface ranges from about 1.8 to about 2.4. In some embodiments, the silicon-to-oxygen ratio (Si/O ratio) at the surface ranges from about 2.0 to about 2.4. In some embodiments, the silicon-to-oxygen ratio (Si/O ratio) at the surface ranges from about 1.0 to about 2.2. In some embodiments, the silicon-to-oxygen ratio (Si/O ratio) at the surface ranges from about 1.0 to about 2.0. In some embodiments, the silicon-to-oxygen ratio (Si/O ratio) at the surface ranges from about 1.0 to about 1.8. In some embodiments, the silicon-to-oxygen ratio (Si/O ratio) at the surface ranges from about 1.0 to about 1.6. In some embodiments, the silicon-to-oxygen ratio (Si/O ratio) at the surface ranges from about 1.8 to about 2.2. In some embodiments, the silicon-to-oxygen ratio (Si/O ratio) at the surface ranges from about 1.8 to about 2.0.

In some embodiments, the silicon oxide particle may include silicon (Si) and oxygen in a ratio of 2.0 to 2.3 on the surface.

When negative active material having a Si/O ratio of higher than or equal to 2.0 on the surface of a silicon oxide particle, cycle-life may be substantially improved.

In some embodiments, the silicon oxide particles may have a concentration gradient that the silicon (Si) element has an atom % concentration decreasing from the surface toward the core while the oxygen (O) element has an atom % concentration increasing from the surface toward the core.

In some embodiments, the silicon oxide particle may have surface roughness determined by selectively controlling the removal of $SiO_2$. When a silicon oxide such as $SiO_2$ is removed, an empty space may be formed there inside the particle therein. As a result, the silicon oxide particle may have an increased specific surface area. In one embodiment, a negative active material including the silicon oxide particle may have a specific surface area ranging from about 10 to about 500 $m^2/g$. In another embodiment, the negative active material may have a specific surface area ranging from about 10 to about 40 $m^2/g$.

In some embodiments, the silicon oxide particle ($SiO_x$) may have an x value ranging from about 0.5 to about 1.5. In some embodiments, the silicon oxide particle ($SiO_x$) may have an x value ranging from about 0.6 to about 0.95. When the silicon oxide particle includes a silicon (Si) element within the range, capacity and efficiency of a lithium battery may be appropriately improved.

In some embodiments, the silicon oxide particle may further include crystalline Si.

In some embodiments, the negative active material including the silicon oxide particle may further include one (but not Si) selected from an alkali metal, an alkaline-earth metal, an element belonging to Groups 13 to 16, a transition element, a rare earth element, and a combination thereof and specifically, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In some embodiments, the negative active material may have an average particle diameter of about 0.1 μm to about 100 μm.

In some embodiments, the negative active material may further include an oxidation barrier layer on the surface of the silicon oxide particles.

In some embodiments, the oxidation barrier layer may include a carbon-based material such as natural graphite, artificial graphite, carbon black, acetylene black, ketjen black, a carbon fiber, and the like.

In some embodiments, the carbon-based material may have a 0.01 to 0.5 times bigger particle size than the silicon oxide particles.

In some embodiments, the carbon-based material may be included in an amount of 1 to 50 parts by weight based on 100 parts by weight of the silicon oxide. When the carbon-based material is included within the range, oxidation may be well prevented without deteriorating capacity.

In some embodiments, the oxidation barrier layer may be less than or equal to 100 nm thick on the surface of the silicon oxide particle. When the oxidation barrier layer has a thickness within the range, oxidation may be effectively prevented without deteriorating capacity.

In some embodiments, the negative active material including the silicon oxide particles may be silicon oxide-based and may provide high-capacity and improve cycle-life characteristic to a rechargeable lithium battery.

Hereinafter, a method of preparing the negative active material is illustrated.

In some embodiments, the method of preparing a negative active material may include contacting amorphous silicon oxide powder with an etchant.

In one embodiment, the amorphous silicon oxide and the etchant are used in a mole ratio of about 10:1 to about 1:10. In some embodiments, the amorphous silicon oxide and the etchant may be used in a mole ratio ranging from about 1:1.1 to about 1:2.1. When the amorphous silicon oxide and the etchant are used within the weight ratio range, the oxidation number of silicon on the surface of the silicon oxide may be lowered within the above range.

Methods to prepare a silicon oxide particle having a Si/O ratio of higher than or equal to 1.8 on the surface of a silicon oxide particle are not conventionally known. Some embodiments provide a method where crystalline $SiO_2$ may be selectively removed from the surface of the silicon oxide particles by contacting silicon oxide powder with the etchant. In some embodiments, the negative active material comprising a silicon oxide particles having a Si/O ratio of higher than or equal to 1.0 on the surface of a silicon oxide particle may be prepared by controlling the ratio between the silicon oxide powder and etchant. According to the desired Si/O ratio on the surface of a silicon oxide particles, appropriate concentration of the etchant may be selected and employed to obtain the negative active material comprising a silicon oxide particles having a desired Si/O ratio on the surface of the silicon oxide particles.

In some embodiments, the amorphous silicon oxide may be prepared in a common method or commercially available.

In some embodiments, the etchant may be a material used for a commonly-known etching solution without any limit and for example, may include an acid such as nitric acid, sulfuric acid, and the like or HF, $NH_4F$, $NH_4HF_2$, and the like. In some embodiments, the etchant including one or more F ion-containing compounds may more rapidly promote an etching process.

In some embodiments, the etchant may include a solvent such as water and the like.

In some embodiments, the etchant-containing solution may have a concentration determined to realize an appropriate etching speed. In some embodiments, the etchant-containing solution may have a F ion concentration ranging from 0.5M to 12M. An etchant that does not include a F ion may control an etching speed depending on concentration and for example, have a concentration bringing about the same etching speed as the etchant-containing solution having the 0.5M to 12M F ion concentration. For example, an acid solution may require a higher concentration of active species to accomplish the same etching speed and effect as the F ion-containing compound solution.

When the amorphous silicon oxide powder and the etchant are used to prepare a negative active material including a silicon oxide having a low oxidation number of silicon on the surface, the negative active material may be further washed or dried in a typical manner. In some embodiments, the washing may be performed using alcohol such as methanol, ethanol, isopropanol, and the like. In some embodiments, the drying may be performed at a temperature ranging from 80 to 120° C. under an inert gas atmosphere.

In some embodiments, the preparing method may further include formation of an oxidation barrier layer by surface-treating the negative active material with a carbon-based material to prevent surface oxidation of the negative active material.

In some embodiments, the carbon-based material may include a carbon or metal conductive agent and the like.

The surface treatment may include any common method of forming a layer without a particular limitation and for example, coating, impregnation, spraying, and the like.

Some embodiments provide a rechargeable lithium battery including a negative electrode including the negative active material; a positive electrode including a positive active material; and a non-aqueous electrolyte.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size.

Figure 1:
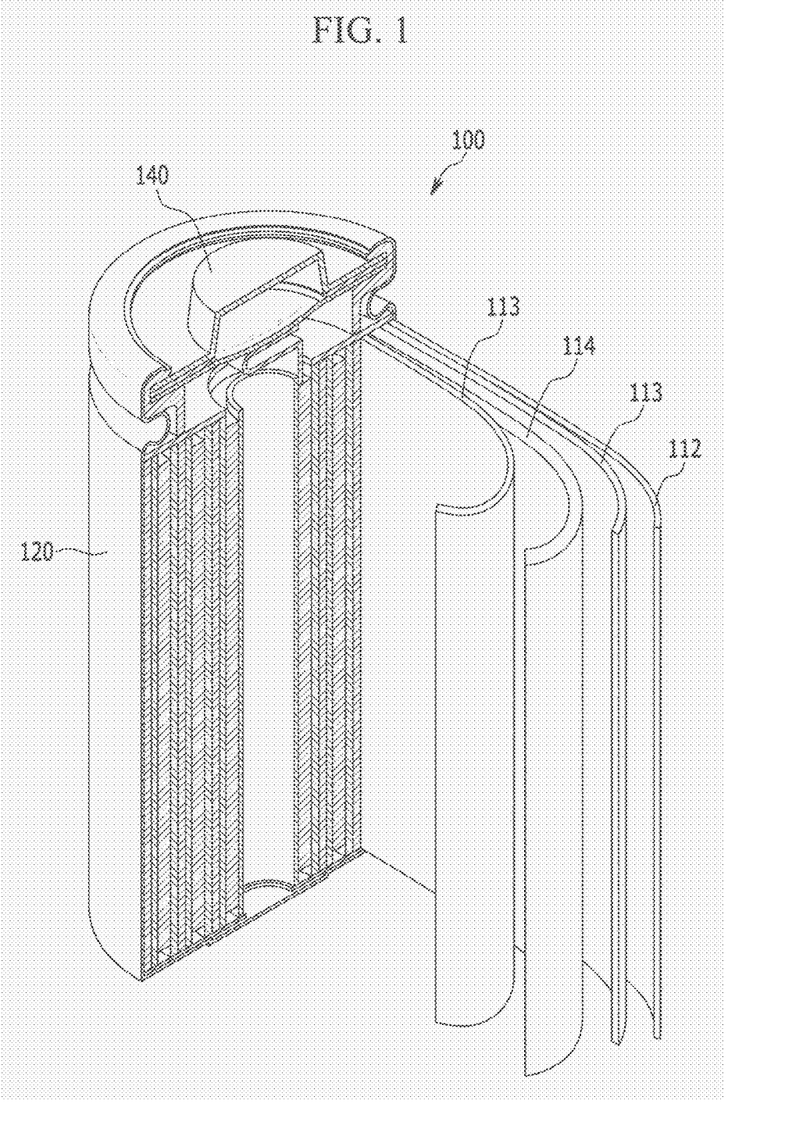
FIG. 1 is a schematic view of a rechargeable lithium battery according to one embodiment.

FIG. 1 is an exploded perspective view of a rechargeable lithium battery in accordance with an embodiment of the present disclosure. Referring to FIG. 1, the rechargeable lithium battery 100 is formed with a cylindrical shape and includes a negative electrode 112, a positive electrode 114, a separator 113 disposed between the a positive electrode 114 and negative electrode 112, an electrolyte (not shown) impregnated in the negative electrode 112, the positive electrode 114, and the separator 113, a battery case 120, and sealing member 140 sealing the battery case 120. In some embodiments, the rechargeable lithium battery 100 may be fabricated by sequentially stacking a negative electrode 112, a positive electrode 114, and separator 113, and spiral-winding them and housing the wound product in the battery case 120.

The negative electrode includes a current collector and a negative active material layer formed on the current collector, and the negative active material layer includes the negative active material. The negative active material is the same as described above. In some embodiments, the negative active material layer may include a binder, and optionally may further include a conductive material.

The binder improves binding properties of the negative active material particles to each other and to a current collector. Examples of the binder include at least one selected from the group consisting of polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon and the like, but are not limited thereto.

The conductive material provides an electrode with conductivity. Any electrically conductive material may be used as a conductive material unless it causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

In some embodiments, the current collector may be a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector.

The positive active material includes lithiated intercalation compounds that reversibly intercalate and deintercalate lithium ions. In some embodiments, the positive active material may include a composite oxide including at least one selected from the group consisting of cobalt, manganese, and nickel, as well as lithium. In some embodiments, one or more of the following lithium-containing compounds may be used:

$Li_aA_{1-b}R_bD^1_2$ (0.90≤a≤1.8 and 0≤b≤0.5);
$Li_aE_{1-b}R_bO_{2-c}D^1_c$ (0.90≤a≤1.8, 0≤b≤0.5 and 0≤c≤0.05);
$LiE_{2-b}R_bO_{4-c}D^1_c$ (0≤b≤0.5, 0≤c≤0.05);
$Li_aNi_{1-b-c}Co_bR_cD^1_\alpha$ (0.90≤a≤1.8, 0≤b≤0.5, 0≤c≤0.05 and 0<α≤2);
$Li_aNi_{1-b-c}Co_bR_cO_{2-\alpha}Z_\alpha$ (0.90≤a≤1.8, 0≤b≤0.5, 0≤c≤0.05 and 0<α<2);
$Li_aNi_{1-b-c}Co_bR_cO_{2-\alpha}Z_2$ (0.90≤a≤1.8, 0≤b≤0.5, 0≤c≤0.05 and 0<α<2);
$Li_aNi_{1-b-c}Mn_bR_cD^1_\alpha$ (0.90≤a≤1.8, 0≤b≤0.5, 0≤c≤0.05 and 0<α≤2);
$Li_aNi_{1-b-c}Mn_bR_cO_{2-\alpha}Z_\alpha$ (0.90≤a≤1.8, 0≤b≤0.5, 0≤c≤0.05 and 0<α<2);
$Li_aNi_{1-b-c}Mn_bR_cO_{2-\alpha}Z_2$ (0.90≤a≤1.8, 0≤b≤0.5, 0≤c≤0.05 and 0<α<2);
$Li_aNi_bE_cG_dO_2$ (0.90≤a≤1.8, 0≤b≤0.9, 0≤c≤0.5 and 0.001≤d≤0.1);
$Li_aNi_bCo_cMn_dGeO_2$ (0.90≤a≤1.8, 0≤b≤0.9, 0≤c≤0.5, 0≤d≤0.5 and 0.001≤e≤0.1);
$Li_aNiG_bO_2$ (0.90≤a≤1.8 and 0.001≤b≤0.1);
$Li_aCoG_bO_2$ (0.90≤a≤1.8 and 0.001≤b≤0.1);
$Li_aMnG_bO_2$ (0.90≤a≤1.8 and 0.001≤b≤0.1);

$Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; $D^1$ may be O (oxygen), F (fluorine), S (sulfur), P (phosphorus), or a combination thereof; E may be Co, Mn, or a combination thereof; Z may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; T is Cr, V, Fe, Sc, Y, or a combination thereof; and J may be V, Cr, Mn, Co, Ni, Cu, or a combination thereof.

In some embodiments, the compound can have a coating layer on the surface, or can be mixed with a compound having a coating layer. In some embodiments, the coating layer may include an oxide of a coating element, a hydroxide of a coating element, an oxyhydroxide of a coating element, an oxycarbonate of a coating element, or a hydroxyl carbonate of a coating element. In some embodiments, the compounds for a coating layer can be amorphous or crystalline. In some embodiments, the coating element for a coating layer may include Ag, Au, Pt, Pd, Cu, Ni, Mg, Al, Co, K, Na, Ca, Si, Ti, V, Sn, Ge, Ga, B, As, Zr, or a mixture thereof. In some embodiments, the coating layer can be formed in a method having no negative influence on properties of a positive active material by including these elements in the compound. For example, the method may include any coating method such as spray coating, dipping, and the like, but is not illustrated in more detail, since it is well-known to those who work in the related field.

In some embodiments, the positive active material layer may include a binder and a conductive material.

In some embodiments, the binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to provide conductivity to an electrode. In the battery including the same, it may include any electronic conductive material as long as causing no chemical change. For example, it may include natural graphite, artificial graphite, carbon black, acetylene black, ketjen black, carbon fiber, metal powder, metal fiber or the like such as copper, nickel, aluminum, silver or the like, or one or at least one kind mixture of conductive material such as polyphenylene derivative or the like.

In some embodiments, the current collector may be Al (aluminum) but is not limited thereto.

In some embodiments, the negative and positive electrodes may be fabricated by a method including mixing the active material, a conductive material, and a binder into an active material composition, and coating the composition on a current collector, respectively. In some embodiments, the solvent includes N-methylpyrrolidone and the like but is not limited thereto.

In some embodiments, the electrolyte includes a non-aqueous organic solvent and a lithium salt.

In some embodiments, the non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent. In some embodiments, the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like. The ester-based solvent may include methyl acetate, ethyl acetate, n-propyl acetate, methylpropionate, ethylpropionate, γ-butyrolactone, decanolide, valerolactone, mevalonolactone, caprolactone, or the like. In some embodiments, the ether-based solvent includes dibutyl ether, tetraglyme, diglyme, dimethoxyethane, 2-methyltetrahydrofuran, tetrahydrofuran, or the like, and examples of the ketone-based solvent include cyclohexanone, or the like. In some embodiments, the alcohol-based solvent include ethyl alcohol, isopropyl alcohol, and the like, and examples of the aprotic solvent include nitriles such as R—CN (wherein R is a C2 to C20 linear, branched, or cyclic hydrocarbon group including a double bond, an aromatic ring, or an ether bond), amides such as dimethylformamide, dioxolanes such as 1,3-dioxolane, sulfolanes, or the like.

In some embodiments, the non-aqueous organic solvent may be used singularly or in a mixture. When the organic solvent is used in a mixture, the mixture ratio can be controlled in accordance with a desirable battery performance.

In some embodiments, the carbonate-based solvent may be prepared by mixing a cyclic carbonate and a linear carbonate. In some embodiments, the cyclic carbonate and the linear carbonate may be mixed together in the volume ratio of about 1:1 to about 1:9. Within this range, performance of electrolyte may be improved.

In some embodiments, the non-aqueous organic electrolyte may be further prepared by mixing a carbonate-based solvent with an aromatic hydrocarbon-based solvent. In some embodiments, the carbonate-based and the aromatic hydrocarbon-based solvents may be mixed together in a volume ratio ranging from about 1:1 to about 30:1.

In some embodiments, the aromatic hydrocarbon-based organic solvent may be represented by the following Chemical Formula 1.

Chemical Formula 1

In Chemical Formula 1, $R_1$ to $R_6$ are each independently hydrogen, a halogen, a C1 to C10 alkyl group, a C1 to C10 haloalkyl group, or a combination thereof.

In some embodiments, the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In some embodiments, the non-aqueous electrolyte may further include vinylene carbonate, an ethylene carbonate-based compound represented by the following Chemical Formula 2, or a combination thereof to improve cycle-life as an additive.

Chemical Formula 2

In Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

In some embodiments, the lithium salt is dissolved in an organic solvent, supplies lithium ions in a battery, operates a basic operation of the rechargeable lithium battery, and improves lithium ion transportation between positive and negative electrodes therein. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers of 1 to 20, respectively), LiCl, LiI, $LiB(C_2O_4)_2$ (lithium bis(oxalato) borate), or a combination thereof, as a supporting electrolytic salt. In some embodiments, the lithium salt may be used in a concentration ranging from about 0.1M to about 2.0M. When the lithium salt is included at the above concentration range, an electrolyte may have excellent performance and lithium ion mobility due to optimal electrolyte conductivity and viscosity.

In some embodiments, the separator 113 may include any materials commonly used in the conventional lithium battery as long as separating a negative electrode 112 from a positive electrode 114 and providing a transporting passage of lithium ion. In other words, it may have a low resistance to ion transport and an excellent impregnation for electrolyte. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The following examples illustrate the present embodiments in more detail. These examples, however, should not in any sense be interpreted as limiting the scope of the present embodiments.

EXAMPLES

Preparation Section

Example 1: Preparation of Negative Active Material 100 g of amorphous silicon oxide powder (silicon oxide particles without surface modification) available from ShinEtsu Co. Ltd. (Tokyo, Japan) was dispersed in an aqueous solution including 40 volume % of ethanol (350 mL). While the dispersed solution was agitated at a speed of 300 RPM, a 49 volume % HF aqueous solution (80 mL) was added thereto at a rate of 1 mL/min. The resulting mixture was allowed to stand an additional 30 minutes. Subsequently, the mixture was transmitted and washed with 5 L of distilled water using a reduced pressure filtering device, obtaining surface-modified silicon oxide particles for use as a negative active material.

Example 2: Preparation of Negative Active Material 100 g of amorphous silicon oxide powder (silicon oxide particles without surface modification) available from ShinEtsu Co. Ltd. was dispersed in an aqueous solution including 40 volume % of ethanol (350 mL). While the dispersed solution was agitated at a speed of 300 RPM, a 49 volume % HF aqueous solution (100 mL) was added thereto at a rate of 1 mL/min. The resulting mixture was allowed to stand an additional 30 minutes. Subsequently, the mixture was transmitted and washed with 5 L of distilled water using a reduced pressure filtering device, obtaining surface-modified silicon oxide particles for use as a negative active material.

Example 3: Preparation of Negative Active Material

A negative active material was prepared according to the same method as Example 1 except for adding 150 mL of a 49 volume % HF aqueous solution.

Comparative Example 1: Preparation of Negative Active Material

Amorphous silicon oxide powder (silicon oxide particles without surface modification) available from ShinEtsu Co. Ltd. itself was used as a negative active material.

Comparative Example 2: Preparation of Negative Active Material 100 g of amorphous silicon oxide powder (silicon oxide particles without surface modification) available from ShinEtsu Co. Ltd. was dispersed in an aqueous solution including 40 volume % of ethanol (350 mL). While the dispersed solution was agitated at a speed of 300 RPM, a 49 volume % HF aqueous solution (10 mL) was added thereto at a rate of 1 mL/min. The resulting mixture was allowed to stand an additional 30 minutes. Subsequently, the mixture was transmitted and washed with 5 L of distilled water using a reduced pressure filtering device, obtaining a negative active material.

Comparative Example 3: Preparation of Negative Active Material

A negative active material was prepared according to the same method as Comparative Example 2 except for adding 30 mL of a 49 volume % HF aqueous solution.

Comparative Example 4: Preparation of Negative Active Material

A negative active material was prepared according to the same method as Comparative Example 2 except for adding 50 mL of a 49 volume % HF aqueous solution.

Analysis Section

Experimental Example 1: Internal Concentration Measurement Using X-Ray Photoelectron Spectroscopy (XPS)

The amorphous silicon oxide according to Comparative Example 1 and the negative active material particle according to Comparative Example 2 were analyzed using X-ray photoelectron spectroscopy (XPS). The results are provided in FIGS. 2 and 3.

XPS Analysis Conditions
Analysis equipment: ESCA 250 spectrometer (Thermo Scientific, Waltham, Mass.)
Pressure in an analysis chamber: $8*10^{-10}$ mbar
Used radioactive ray: monochromatic $Al_k$,
X-ray activation energy: 1486.8 eV
Analysis area: 500 μm$^2$
About thickness of a surface layer in XPS analysis: about 5 nm
Depth condition: depth profile was obtained by $Ar^+$ ion beam sputtering (3 keV). The sputtering speed for $SiO_2$ was 10 nm/min.

Figure 2:
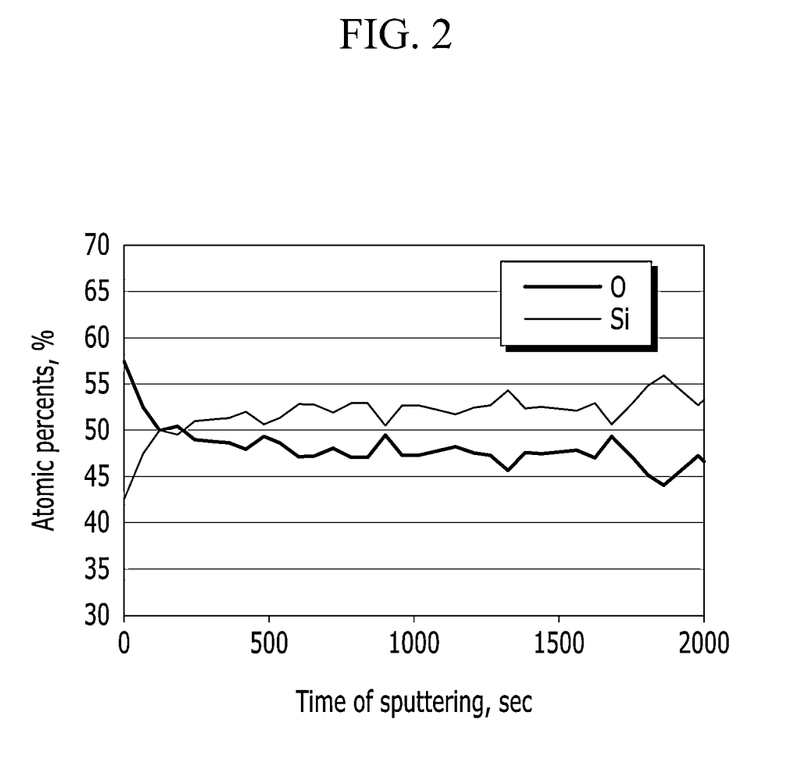
FIG. 2 is an XPS (X-ray photoelectron spectroscopy) analysis graph of the negative active material particle according to Comparative Example 1.

FIG. 2 shows analysis results of the amorphous silicon oxide particle according to Comparative Example 1, in which the surface of the amorphous silicon oxide particle was oxidized and abundantly included oxygen.

Figure 3:
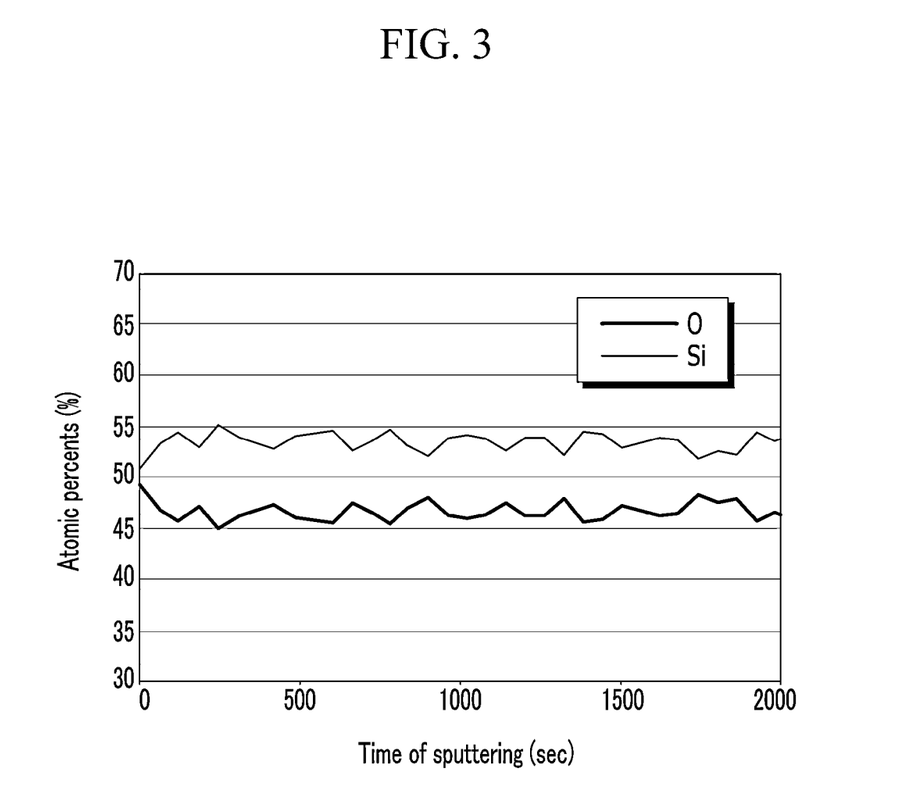
FIG. 3 is an XPS analysis graph of the negative active material particle according to Comparative Example 2.
Figure 4:
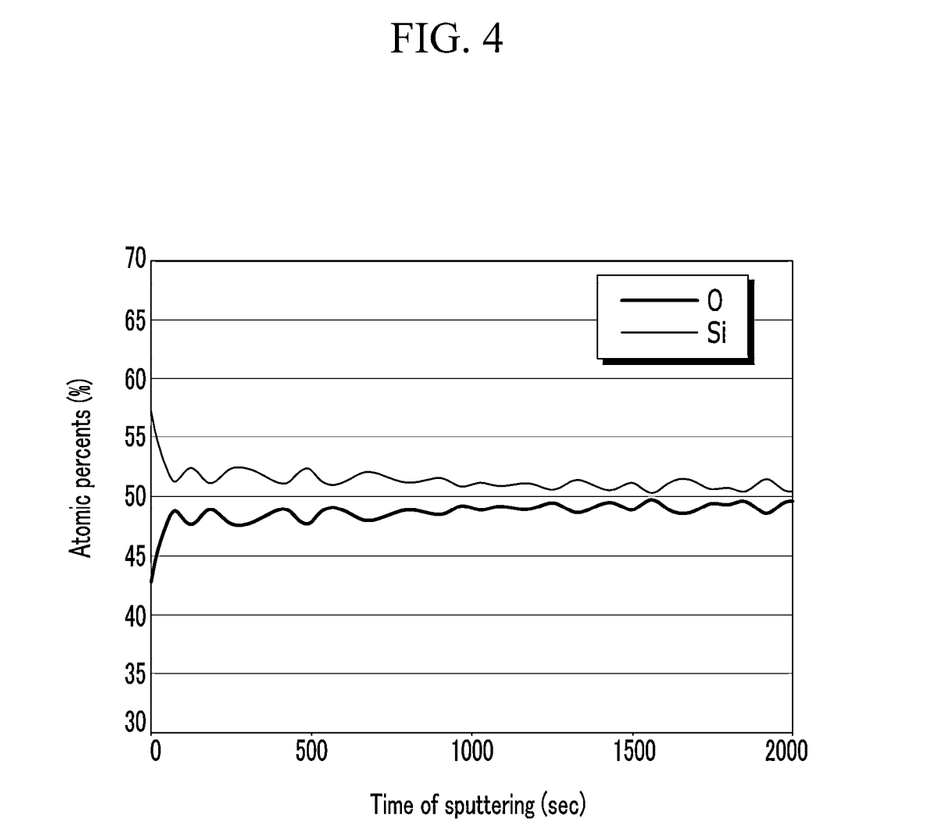
FIG. 4 is an XPS analysis graph of the negative active material particle according to Comparative Example 3.
Figure 5:
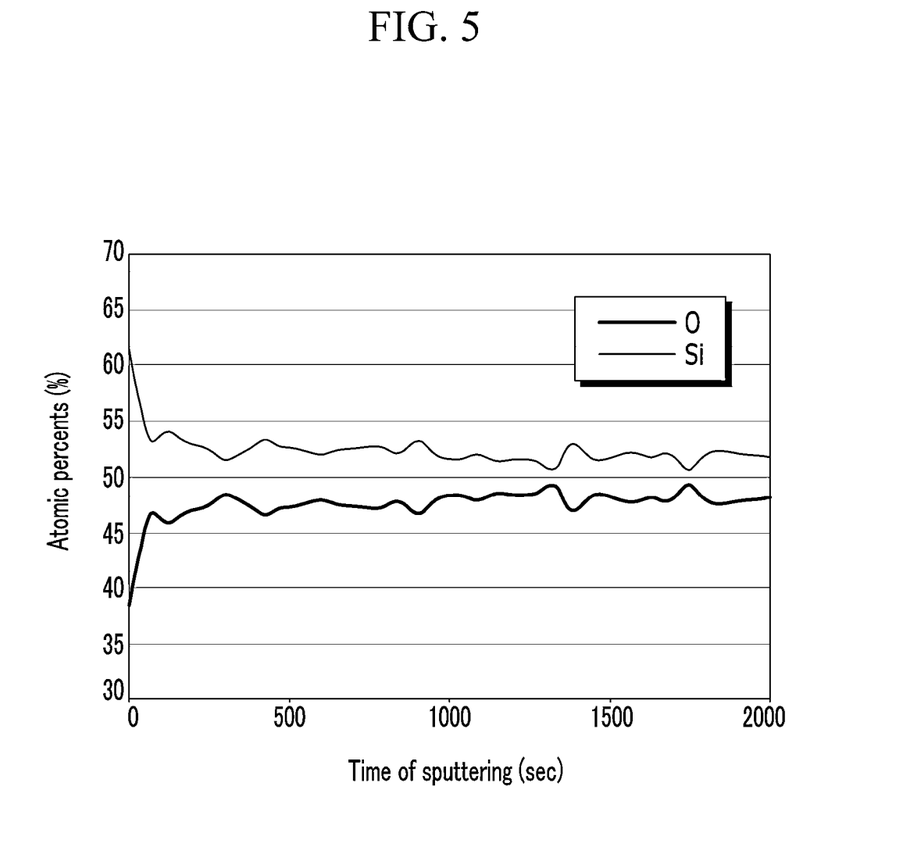
FIG. 5 is an XPS analysis graph of the negative active material particle according to Comparative Example 4.

FIGS. 3 to 5 show analysis results of the negative active materials according to Comparative Examples 2 to 4, which show that the Si/O ratios on the surfaces of the silicon oxide particles are different in proportion to the concentration of the etchant. That is, the higher the concentration of the etchant, the higher the Si ratio on the surface of the silicon oxide particles. In all results, the silicon oxide particles had higher Si ratio on the surface but a smooth concentration gradient of silicon (Si) toward the core of the silicon oxide particles.

Figure 6:
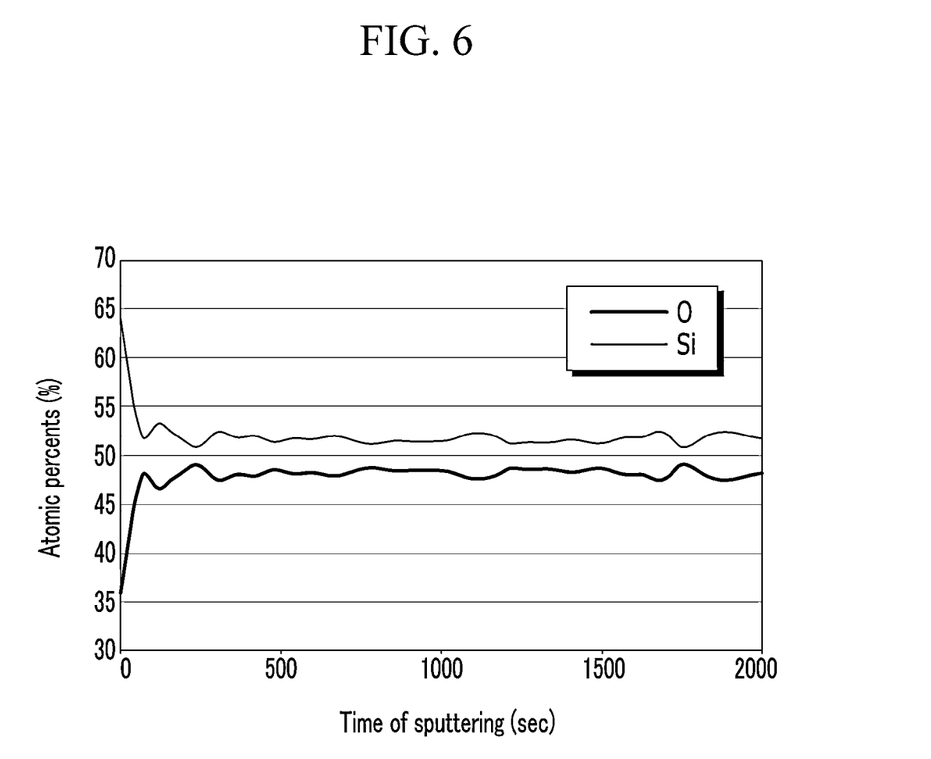
FIG. 6 is an XPS analysis graph of the negative active material particle according to Example 1.
Figure 7:
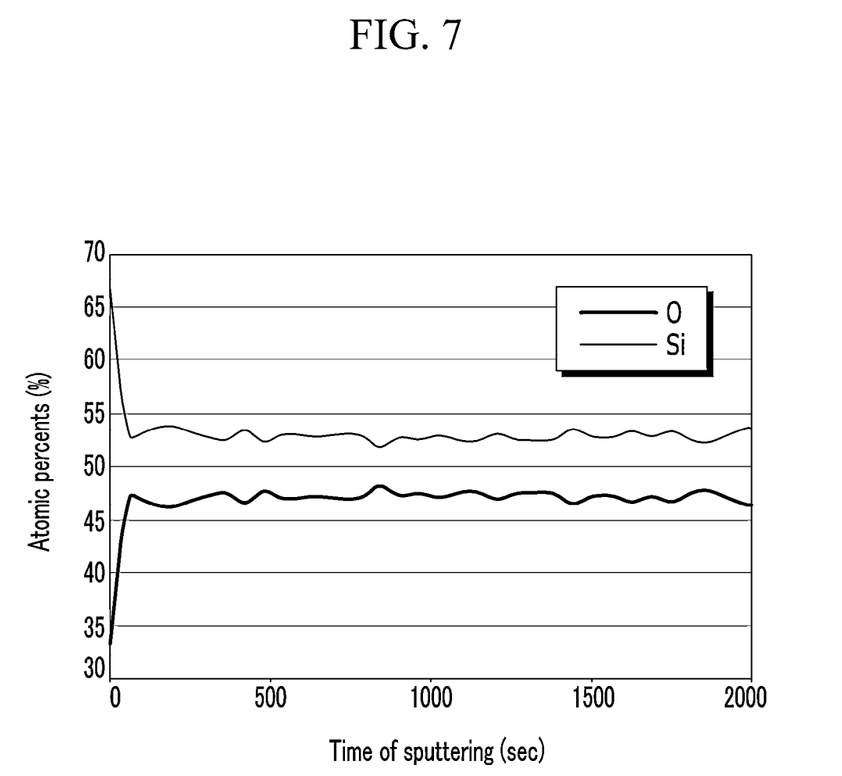
FIG. 7 is an XPS analysis graph of the negative active material particle according to Example 2.
Figure 8:
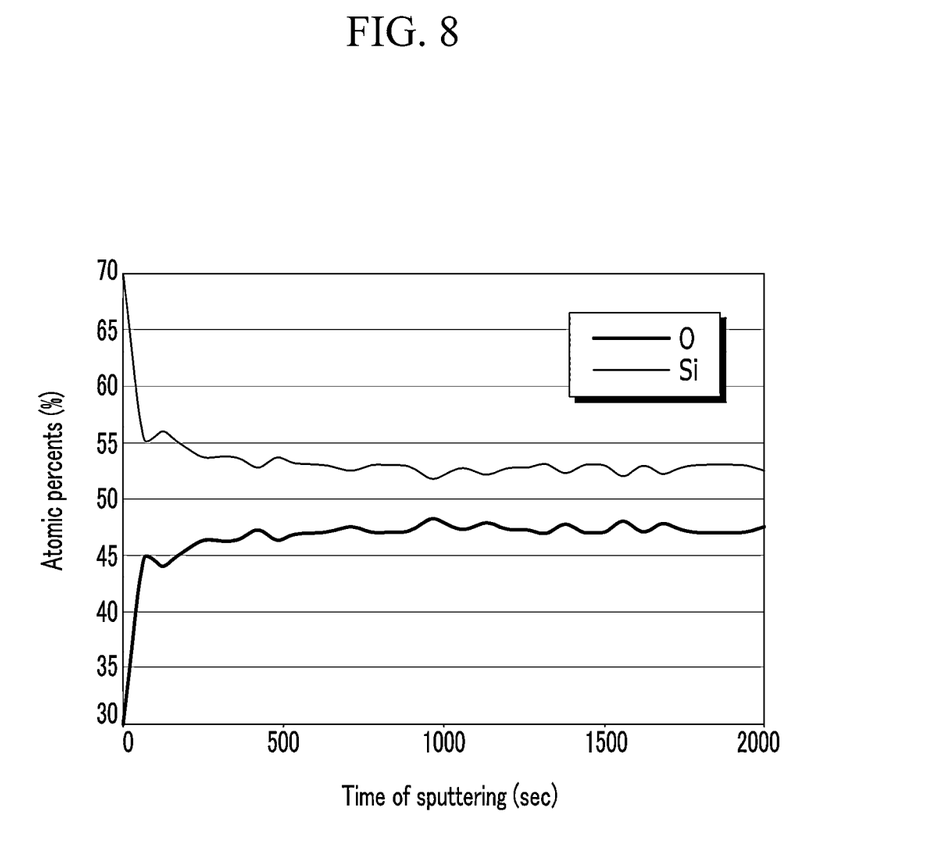
FIG. 8 is an XPS analysis graph of the negative active material particle according to Example 3.

FIGS. 6 to 8 show analysis results of the negative active materials according to Examples 1 to 3, which also show that the Si/O ratios on the surfaces of the silicon oxide particles are different in proportion to the concentration of the etchant. The negative active materials according to Examples 1 to 3 have much higher Si ratios on the surfaces of the silicon oxide particles than those according to Comparative Examples 2 to 4, as being reacted with the etchants of much higher concentrations. In all results, the silicon oxide particles had higher Si ratio on the surface but a smooth concentration gradient of silicon (Si) toward the core of the silicon oxide particles.

Fabrication Section

Experimental Example 2: Capacity Characteristic Evaluation

The negative active materials according to Examples 1 to 3 and Comparative Examples 1 to 4 were respectively used to fabricate a 2016 coin-type half-cells. Herein, a substrate had a composition having an active material: a conductive material: a binder=80:10:10 in a weight ratio. The conductive material was Denka black, the binder was PI (polyimide), and a solvent was NMP (N-methyl-2-pyrrolidone). Then, a battery cell was fabricated by using a lithium metal as a counter electrode, inserting a separator between the substrate and the counter electrode, injecting an electrolyte solution therein, and sealing the battery case. The electrolyte solution was prepared by adding 5 volume % of FEC (fluorinated ethyl carbonate) as an additive to a mixed solvent prepared by mixing EC (ethylenecarbonate)/EMC (ethylmethylcarbonate)/DMC (dimethylcarbonate) in a volume ratio of 3/3/4.

Results Section

Experimental Example 3: Cycle-Life Characteristic Evaluation

Each rechargeable lithium battery cell was charged 50 times and discharged at 25° C. in a range of 3.0 to 4.2V with current density of 0.5 C. As a result, initial capacity and capacity retention obtained as a ratio of the 50$^{th}$ cycle discharge capacity relative to the initial capacity are provided in Table 1.

TABLE 1

| | [Si]/[O] ratio | 1$^{st}$ charge capacity [mAh/g] | 1$^{st}$ discharge capacity [mAh/g] | First cycle efficiency (%) | Capacity retention (%) |
|---|---|---|---|---|---|
| Example 1 | 1.8 | 2387 | 1545 | 64.7 | 95.7 |
| Example 2 | 2.0 | 2395 | 1554 | 64.9 | 96.8 |
| Example 3 | 2.4 | 2394 | 1488 | 62.2 | 85.7 |
| Comparative Example 1 | 0.8 | 2330 | 1337 | 57.4 | 72.9 |
| Comparative Example 2 | 1.0 | 2350 | 1497 | 63.7 | 90.2 |
| Comparative Example 3 | 1.3 | 2382 | 1538 | 64.6 | 92.5 |
| Comparative Example 4 | 1.6 | 2388 | 1541 | 64.5 | 93.6 |

As shown in Table 1, when negative active material comprising a silicon oxide having a Si/O ratio of higher than or equal to 1.8 on the surface of a silicon oxide particle, both the 1st charge capacity and capacity retention have been remarkably improved compared with that having a Si/O ratio of less than 1.8.

Accordingly, a lithium rechargeable battery comprising a negative active material including the silicon oxide particles having a Si/O ratio between 1.8 to 2.4 on the surface of a silicon oxide particle, electrochemical properties, such as cycle-life, may improve.

In the present disclosure, the terms "Example," "Comparative Example" and "Experimental Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A negative active material comprising:
surface modified silicon oxide particles having a bulk formula represented by $SiO_x$ ($0.6 \le x \le 0.95$), said particles comprising a surface and a surface region having a depth wherein the depth of the surface region is from 2 nm to 40 nm from the surface, wherein a silicon-to-oxygen ratio (Si/O ratio) of the surface region ranges from about 1.8 to about 2.0, wherein oxygen has an increasing concentration profile within the depth from the surface, whereas silicon has a decreasing concentration profile within the depth from the surface, wherein the negative active material has an average particle diameter ranging from about 0.1 μm to about 100 μm, and wherein the negative active material has a specific surface area ranging from about 5 $m^2$/g to about 500 $m^2$/g.

2. The negative active material of claim 1, wherein the depth of the surface region is from 5 nm to 20 nm from the surface.

3. The negative active material of claim 1, wherein the depth of the surface region is from 5 nm to 15 nm from the surface.

4. The negative active material of claim 1, wherein the silicon content of the surface is measured using X-ray photoelectron spectroscopy (XPS) with ion beam sputtering.

5. The negative active material of claim 1, wherein the oxygen content of the surface is measured using X-ray photoelectron spectroscopy (XPS) with ion beam sputtering.

6. The negative active material of claim 2, wherein the Si/O ratio ranges from 1.8 to 2.0.

7. The negative active material of claim 1, wherein the bulk formula is represented by $SiO_x$ ($0.6<x<0.95$).

8. The negative active material of claim 1, wherein the negative active material has a specific surface area ranging from 5 $m^2$/g to 500 $m^2$/g.

9. The negative active material of claim 8, wherein the negative active material has a specific surface area ranging from about 10 $m^2$/g to about 40 $m^2$/g.

10. The negative active material of claim 1, wherein the surface modified silicon oxide particles further comprise a coating or deposits of a carbonaceous material on the surface thereof.

11. The negative active material of claim 1, further comprising a carbonaceous material mixed with the surface modified silicon oxide particles.

12. A rechargeable lithium battery comprising:
a negative electrode;
a positive electrode; and
an electrolyte,
wherein the negative electrode comprises:
a current collector comprising two major surfaces; and
the negative active material of claim 1 formed on at least one of the two major surfaces.

13. The rechargeable lithium battery of claim 12, wherein the current collector comprises at least one selected from the group consisting of a copper foil, a nickel foil, a stainless steel foil, a titanium foil, a nickel foam, a copper foam, and a polymer substrate coated with a conductive metal.

* * * * *